H. SKAER.
COTTON PICKER.
APPLICATION FILED DEC. 16, 1911.
1,036,357.
Patented Aug. 20, 1912.
3 SHEETS—SHEET 2.
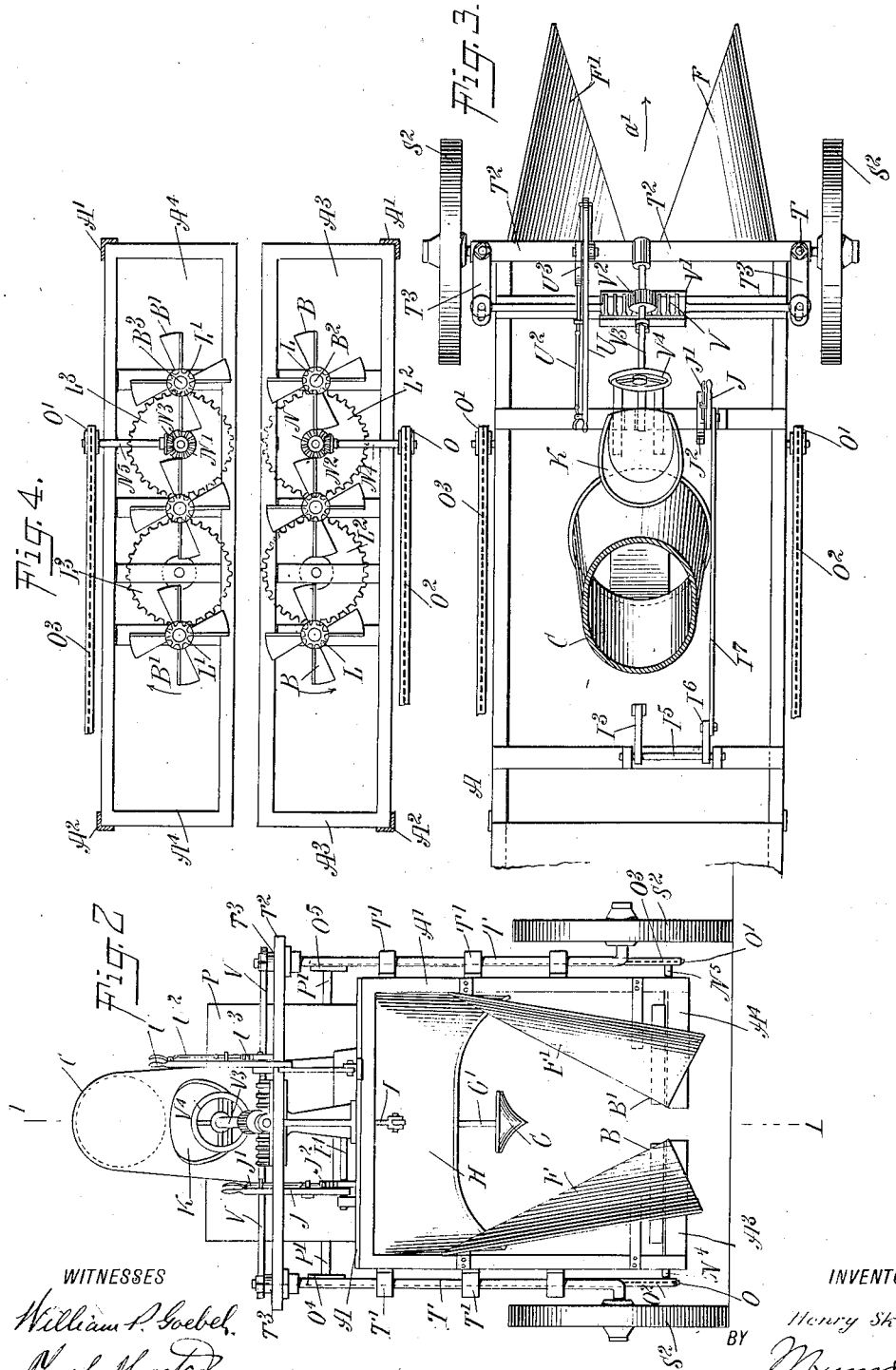

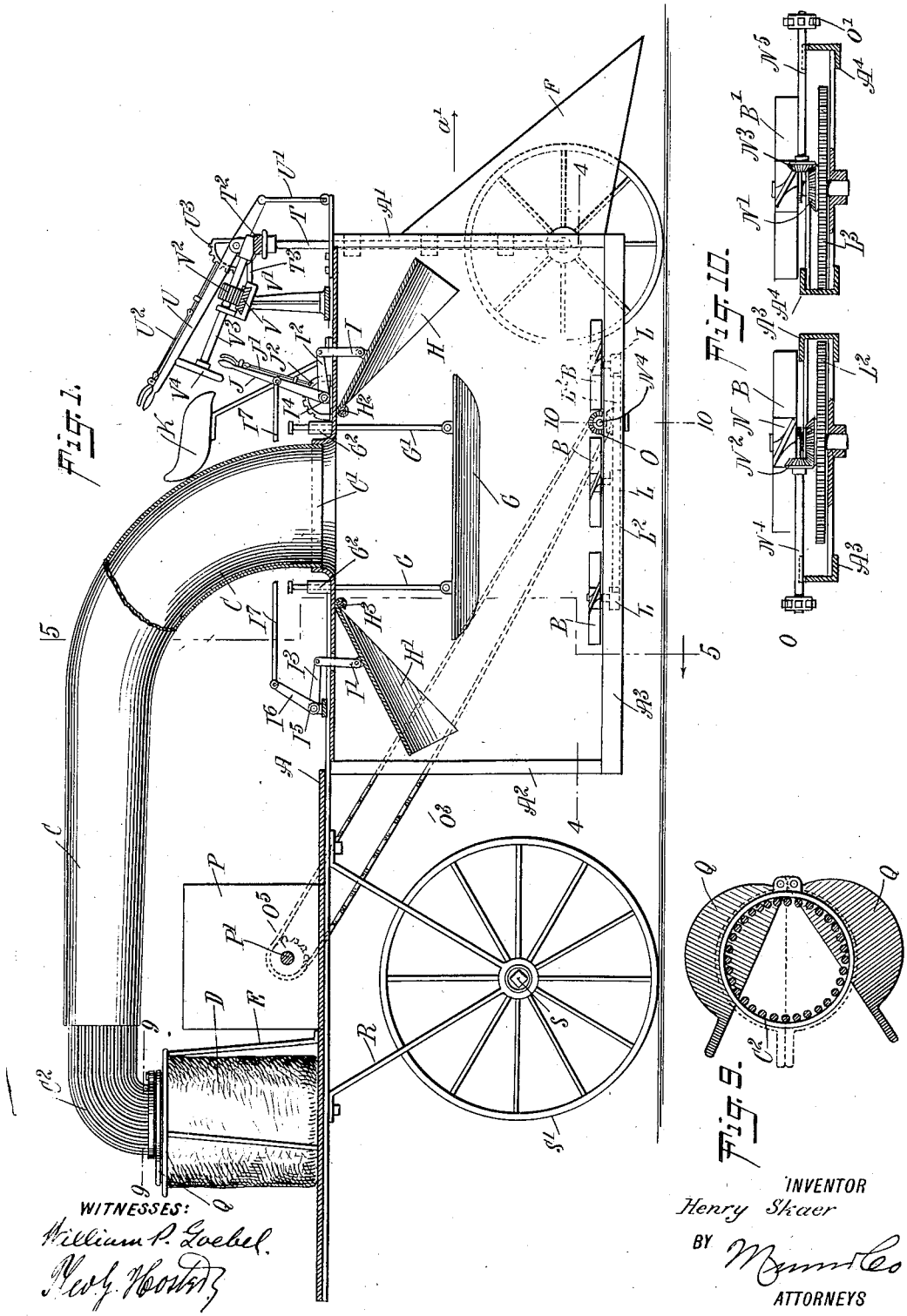

H. SKAER.
COTTON PICKER.
APPLICATION FILED DEC. 16, 1911.
1,036,357.
Patented Aug. 20, 1912.
3 SHEETS—SHEET 3.
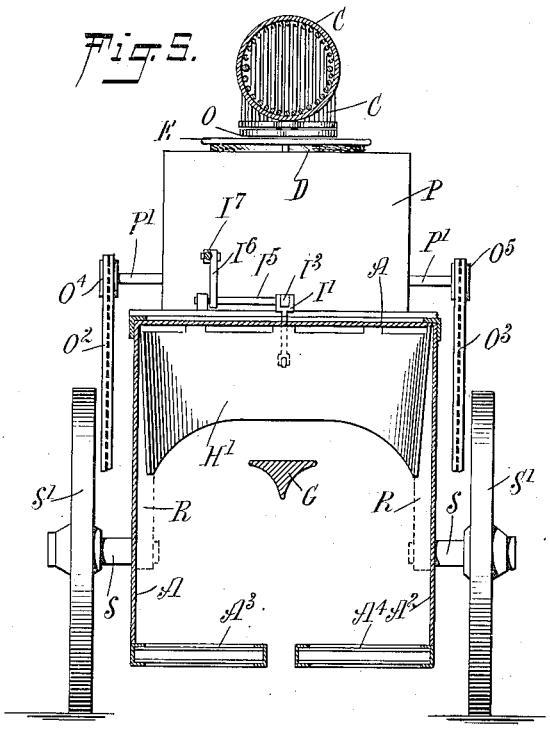
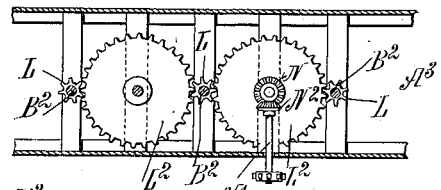
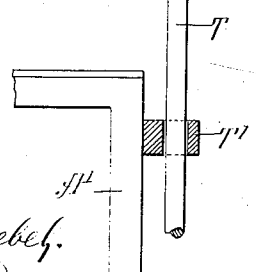
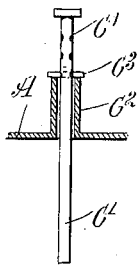
WITNESSES
William P. Goebel
Geo. Hoster
INVENTOR
Henry Skaer
BY Munn & Co
ATTORNEYS

UNITED STATES PATENT OFFICE.

HENRY SKAER, OF TAMAROA, ILLINOIS.

COTTON-PICKER.

1,036,357.

Specification of Letters Patent.  Patented Aug. 20, 1912.

Application filed December 16, 1911.  Serial No. 666,142.

*To all whom it may concern:*

Be it known that I, HENRY SKAER, a citizen of the United States, and a resident of Tamaroa, in the county of Perry and State of Illinois, have invented a new and Improved Cotton-Picker, of which the following is a full, clear, and exact description.

The object of the invention is to provide a new and improved cotton picker arranged to readily remove or pick the ripe bolls of cotton from the plants without danger of injuring the foliage or blossoms, and to permit of repeated use to gather all the cotton bolls as they gradually ripen from the bottom of the plants upward to the top thereof.

For the purpose mentioned, use is made of air propellers arranged to pass along the lower portions of the plants and forcing an air blast upwardly against the bolls of cotton to detach the same from the plants, and a conducting tube above the plants for receiving the detached bolls of cotton.

A practical embodiment of the invention is represented in the accompanying drawings forming a part of this specification, in which similar characters of reference indicate corresponding parts in all the views.

Figure 1 is a longitudinal central section of the cotton picker on the line 1—1 of Fig. 2; Fig. 2 is a front end elevation of the same; Fig. 3 is a plan view of the front end of the cotton picker with the receiving tube shown in section; Fig. 4 is a sectional plan view of the same on the line 4—4 of Fig. 1; Fig. 5 is a transverse section of the same on the line 5—5 of Fig. 1; Fig. 6 is a sectional plan view of the driving gear for the air propellers; Fig. 7 is an enlarged transverse section of the adjustable connection for the front end of the support; Fig. 8 is an enlarged sectional side elevation of the adjustable support for the spreader; Fig. 9 is an enlarged sectional plan view of the delivery end of the conducting tube for the said bolls, on the line 9—9 of Fig. 1; and Fig. 10 is an enlarged cross section of the air propeller mechanism, the section being on the line 10—10 of Fig. 1.

The cotton picker is mounted on a wheeled support A adapted to be moved over the field in the direction of the arrow $a'$ by the use of a team or by the employment of motive power. The support A is provided with transversely-extending U-shaped front and rear supports $A'$, $A^2$ supporting at their lower ends longitudinal members $A^3$, $A^4$ spaced apart to permit the passage of the cotton plants between the said members, the latter being near the ground so as to pass close to the lower portions of the row of cotton plants on opposite sides of the row. On the members $A^3$, $A^4$ are mounted sets of air propellers B and $B'$ in the form of horizontally-disposed propeller wheels so that when the wheels are rotated they produce currents of air flowing in an upward direction against the bolls of cotton held on the plants to detach the bolls from the plants and force the same upward into the mouth $C'$ of a conducting tube C arranged on the top of the support A and extending rearwardly, as plainly indicated in Fig. 1. The air blast produced by the propellers B and $B'$ is sufficient to force the bolls rearwardly through the tube C to be finally discharged into a bag or other receptacle D, removably held on a holder E mounted on the rear of the support A, as plainly shown in Fig. 1. In order to properly guide the cotton plants to the narrow space between the members $A^3$ and $A^4$ of the support A, use is made of guiding wings F and $F'$ attached to the front standard $A'$, the said wings F, $F'$ converging from the front to the rear so as to readily guide the cotton plants between the members $A^3$, $A^4$.

Centrally above the propellers B and $B'$ is arranged a longitudinally-extending spreader G, approximately triangular in cross section, to engage the cotton plants at the top and press the same sidewise in opposite directions with a view to extend the plants over the sets of air propellers B, $B'$ to insure a proper detaching of the cotton bolls from the plants by the air blast. The spreader G is hung on upwardly-extending rods $G'$ slidably engaging bearings $G^2$ attached to the support A, and pins $G^3$ (see Fig. 8) are adapted to engage apertures $G^4$ arranged in the upper ends of the rods $G'$ to support the latter on the top of the bearing $G^2$. By engaging the pins $G^3$ with different apertures $G^4$ the spreader G can be raised or lowered according to the height of the cotton plants on which the machine is used at the time.

In order to insure the proper passage of the detached cotton bolls to the mouth $C'$ of the conducting tube C, use is made of deflectors H and H' pivoted at H², H³ on the support A in front and rear of the mouth C', as plainly indicated in Fig. 1. The deflectors H and H' are held in inclined positions and converge toward the mouth C', so that the detached cotton bolls which are forced upward by the air blast and strike the deflectors H, H' are deflected by the latter in an upward direction into the mouth C' of the conducting tube C. More or less incline can be given to the deflectors H and H', and for this purpose the deflectors H and H' are pivotally connected by links I and I' with arms I², I³ secured on shafts I⁴, I⁵ journaled on the support A, and on the shaft I⁴ is secured a hand lever J under the control of the operator seated on the seat K held on the support A. The hand lever J is provided with a locking device J' adapted to engage a segment J² attached to the support A. The shaft I⁵ previously mentioned is provided with an arm I⁶ connected by a link I⁷ with the lever J, so that when the latter is swung forward or backward then a corresponding turning movement is given to the shafts I⁴, I⁵, which by the arms I², I³ and the links I, I' impart a downward or upward swinging movement to the deflectors H and H', and when the desired position is reached the lever J is locked in place by the locking device J' to hold the deflectors H and H' locked in adjusted position.

In order to rotate the horizontally-disposed propellers in unison, the following arrangement is made: On the shafts B², B³ of the propellers B, B' are secured pinions L and L' in mesh with gear wheels L², L³ journaled on the members A³, A⁴, and on the top of the forward gear wheels L², L³ are secured bevel gear wheels N, N' (see Fig. 10) in mesh with bevel gear wheels N², N³ secured on transversely-extending shafts N⁴, N⁵ journaled in suitable bearings attached to the upper side of the members A³, A⁴. On the outer ends of the shafts N⁴, N⁵ are secured sprocket wheels O, O' connected by sprocket chains O², O³ with sprocket wheels O⁴, O⁵, secured on the outer ends of the shaft P' of a motor P, of any approved construction, and mounted on the support A, as plainly indicated in Figs. 1 and 5. When the motor P is running the shafts N⁴, N⁵ are rotated and by the bevel gear wheels N², N and N³, N' rotate the corresponding gear wheels L², L³ whereby rotary motion is transmitted to the several propellers B and B' by the gearing described, so that the said propellers B and B' are rotated in unison to produce air currents or blasts for detaching the bolls from the plants and forcing the bolls into and through the tube C.

The rear or delivery end C² of the delivery tube C is in the form of rods spaced apart to form escape openings for the air, the end C² being curved downwardly to readily discharge the cotton bolls into the bag D supported on the holder E. A valve Q made in two hinged sections is mounted on the terminal of the end C² to permit of closing the said terminal while removing a filled bag D from the holder E and placing an empty bag in position thereon.

The free end of the support A and the parts carried thereby can be raised and lowered, and for this purpose the following arrangement is made: The rear end of the support A is provided with hangers R in which is journaled the rear axle S carrying the rear wheels S', and the front wheels S² are journaled on the lower ends of rods T mounted to slide up and down in suitable bearings T' attached to the U-shaped front standard A', as plainly indicated in Figs. 2 and 7, and the upper ends of the rods T are journaled in a transverse bar T² on which is fulcrumed a hand lever U within convenient reach of the operator seated on the seat K. The forward end of the hand lever U is pivotally connected by a link U' with the forward end of the support A so that when the operator imparts an up and down swinging motion to the lever U an up and down swinging motion is given to the support A through the latter turning on the rear axle S as a fulcrum. After the support A has been raised or lowered at its front end to the desired height above the ground then the lever U is locked in place by a locking device U² mounted on the lever and engaging a notched segment U³ attached to the cross bar T².

In order to enable the operator to steer the front wheels S² in the desired direction, use is made of the following steering device: On the upper ends of the rods T are secured rearwardly-extending arms T³ pivotally connected with a transversely-extending rack V mounted to slide transversely in a suitable bearing V' attached to the support A. The rack V is engaged by a pinion V² secured on a shaft V³ journaled in suitable bearings carried by the cross bar T² and the bearing V', and on the rear end of the shaft V³ is secured a hand wheel V⁴ under the control of the operator seated on the seat K. Thus when the operator turns the hand wheel V⁴ the pinion V² shifts the rack V transversely to the right or to the left, thus imparting a corresponding swinging motion to the arms T³ whereby the rods T are turned to cause the front wheels S² to travel in the desired direction to the right or to the left or straight ahead.

The operation is as follows: When the machine is drawn forward over the field with a row of cotton plants passing between the members A³, A⁴, and the motor P is running then the motion given to the propellers B and B' causes an upward blast to be directed against the cotton plants on opposite sides thereof and in an upward direction so that the bolls are detached from the cotton plants and are blown upward and directed into the mouth C' of the tube C through which the bolls pass together with the air, the latter finally passing out through the spaces in the rear end C² while the cotton bolls drop down into the bag D. When the bag D is filled the valve Q is closed for the time being to permit of removing the filled bag from the holder E and placing an empty bag in position thereon, after which the valve Q is again opened so as to fill the bag with cotton bolls. It is understood that during the forward movement of the machine, the guide wings F, F' readily guide the cotton plants between the members A³, A⁴ so that the branches of the cotton plants overhang the propellers B, B' and the spreader G by coming in contact with the top of the plants turns the upper portions thereof outwardly so that the branches are all subjected to the air currents or blasts emanating from the propellers B and B', and consequently the ripe bolls are readily detached from the plants and forced upward into and through the tube C. As it is well known that cotton bolls ripen from the bottom of the plants upward, it is evident that the machine has to be drawn several times over a row of cotton plants to gather all the bolls, that is, during the first movement of the machine over a row of cotton plants, the lowermost ripe bolls are detached and gathered, and at the following operations the bolls higher up are detached and harvested in the manner above explained.

The cotton picker shown and described is comparatively simple in construction and arranged to effectively detach the cotton bolls from the plants and collect the same in a bag.

Having thus described my invention, I claim as new and desire to secure by Letters Patent:—

1. A cotton picker provided with air propellers arranged to pass along the lower portions of the plants and force an air blast upwardly against the bolls of cotton to detach the same, and a conducting tube above the propellers for receiving the detached bolls of cotton.

2. A cotton picker provided with sets of horizontally-disposed rotary air propellers spaced apart for the passage of the cotton plants between them and arranged to pass along the lower portions of the plants, the said air propellers being arranged to force air blasts upwardly against the bolls of cotton to detach the same, and a conducting tube having its mouth above the propellers for receiving the detached bolls of cotton.

3. A cotton picker, comprising a support having spaced longitudinal bottom members between which pass the cotton plants, horizontally-disposed and rotary air propellers mounted on the said spaced members, and guiding means on the support in front of the propellers for guiding the plants to the said propellers.

4. A cotton picker, comprising a support having spaced longitudinal bottom members, between which pass the cotton plants, horizontally-disposed and rotary air propellers mounted on the said spaced members, and a top spreader on the said support and centrally above the propellers for spreading the plants in opposite directions over the said propellers.

5. A cotton picker, comprising a support having spaced longitudinal bottom members between which pass the cotton plants, horizontally-disposed and rotary air propellers mounted on the said spaced members, a top spreader on the said support and centrally above the propellers for spreading the plants in opposite directions over the said propellers, and a tube on the support and having at one end a mouth arranged centrally above the said spreader.

6. A cotton picker, comprising a support having spaced longitudinal bottom members between which pass the cotton plants, horizontally-disposed and rotary air propellers mounted on the said spaced members, a top spreader on the said support and centrally above the propellers for spreading the plants in opposite directions over the said propellers, a tube on the support and having at one end a mouth arranged centrally above the said spreader, and deflectors on the said support in front and rear of the said tube mouth.

7. A cotton picker, comprising a support having spaced longitudinal bottom members between which pass the cotton plants, horizontally-disposed and rotary air propellers mounted on the said spaced members, a top spreader on the said support and centrally above the propellers for spreading the plants in opposite directions over the said propellers, a tube on the support and having at one end a mouth arranged centrally above the said spreader, deflectors hinged on the said support in front and rear of the said tube mouth, and manually-controlled means connected with the said deflectors to swing the same into a desired inclined position.

8. A cotton picker provided with air propellers arranged to pass along the lower portions of the plants and force air blasts upwardly against the bolls of cotton to detach the same, a top spreader arranged centrally above the propellers for spreading the plants in opposite directions over the said propellers, and a conducting tube above the spreader for receiving the detached bolls of cotton.

9. A cotton picker provided with air propellers spaced apart and arranged to pass along the lower portions of the plants and force air blasts upwardly against the bolls of cotton to detach the same, an adjustable top spreader arranged centrally above the propellers for spreading the plants in opposite directions over the said air propellers, and a tube having at one end a mouth arranged centrally above the spreader, the said tube having its other end constructed for the escape of air.

10. A cotton picker, comprising a support having spaced longitudinal bottom members between which pass the lower portions of the cotton plants, sets of horizontally-disposed air propellers mounted to rotate on the said members, gearings for driving the said sets of propellers in unison, guide members attached to the said support in front of the said propellers, a tube extending rearwardly on the said support and having a mouth centrally arranged above the said propellers, a spreader held vertically adjustable on the said support below the said tube mouth, deflectors hinged on the said support in front and rear of the said tube mouth, and manually-controlled means connected with the said deflectors to adjust the same.

11. A cotton picker, comprising a support having spaced longitudinal bottom members between which pass the cotton plants, horizontally disposed and rotary air propellers mounted on the said spaced members, means for driving the propellers in unison, a longitudinally extending spreader adjustably connected with the support and arranged centrally above the said propellers, the said spreader being approximately triangular in cross section and arranged to spread the plants in opposite directions over the said propellers, a tube on the support and having at one end a mouth arranged centrally above the said spreader, and deflectors on the said support for directing the detached cotton bolls to the mouth of said tube.

In testimony whereof I have signed my name to this specification in the presence of two subscribing witnesses.

HENRY SKAER.

Witnesses:
S. R. HAINES,
M. WHEATLEY.